June 26, 1962 — W. S. STAFF — 3,040,586
VIBRATION DETECTING AND RECORDING SYSTEM
Filed April 17, 1958 — 2 Sheets-Sheet 1

FIG. I.

United States Patent Office 3,040,586
Patented June 26, 1962

3,040,586
VIBRATION DETECTING AND RECORDING SYSTEM
William S. Staff, 4910 W. Amherst St., Dallas 9, Tex.
Filed Apr. 17, 1958, Ser. No. 729,100
4 Claims. (Cl. 73—492)

This invention relates to a system for monitoring vibrations and more particularly to record the maximum acceleration at a given test site. In a more particular aspect the invention relates to the provision of an acceleration detector, a recorder and a system in which the detector and the recorder form principal components.

Substantial problems have been encountered in the measurement and recording of impact or shock in the earth such as occur upon the detonation of explosive charges. Prior systems for monitoring such waves in urban areas have included an indicating type device which does not provide a permanent record without undue expense. Further, prior systems have been found to be limited in the frequency spectrum to which they respond.

In accordance with the present invention there is provided a system for measuring the maximum acceleration of a vibrating body which comprises an accelerometer which feeds an electrical system including means for amplifying and rectifying the signal developed by the accelerometer. The latter system applies a signal to a peak-reading voltmeter for connecting the peak-reading voltmeter to receive the rectified signal voltage. The peak-reading voltmeter includes an integrating or holding condenser to maintain for long periods a charge representative of the maximum amplitude of the signal developed by the accelerometer.

In a more specific aspect of the invention there is provided a meter connected to be deflected in proportion to the voltage on said condenser. A light sensitive card is provided in a holder having a circular slot into which said card is secured with the slot having a radius of curvature centered at the axis of the meter movement and extending in direction parallel to the axis of said meter with an arm extending from and rotating with the meter. With the arm positioned in dependence upon the magnitude of the voltage upon the condenser, a beam of light is directed past the arm onto the card to provide an impression thereon which is indicative of the magnitude of the voltage.

In accordance with the further aspect of the invention, the maximum acceleration of a body over a substantial period of time is measured by generating an electrical signal representative of the acceleration component of the vibration. An electrical signal is produced and maintained as to control a physical condition proportional to the maximum amplitude of the electrical signal. A recording receiving element of the light sensitive type is provided and means are provided for impressing on said element an indication of the magnitude of said condition.

In accordance with the further aspect of the invention there is provided a recorder for making a permanent record of the magnitude of the condition which comprises a rotating element including a coil mounted in a magnetic field. A vane extends from and rotates with the element. A light source is provided adjacent to the tip of the vane and serves in combination with a means for positioning a light sensitive film in an arc symmetrical with respect to the center of rotation of the coil to provide a recording of the position of said vane by means of a baffle intermediate the vane and the film having a slot corresponding with the movement of the vane. An electrical heating element is adjacent to the film in the region of the slot for developing an impression produced on the film.

In accordance with the further aspect of the invention there is provided a vibration sensitive detector which comprises a resiliently supported mass mounted for vibration relative to a base with a grating supported by the mass and mounted in the path of radiant energy. A source of radiant energy is provided together with a second grating mounted in the path of radiation therefrom adjacent to the first grating and orientated as to produce variations in the transmission of radiation along said path dependent upon said vibration of the first grating relative to the second grating. An element responsive to radiant energy is provided in the path which includes both said gratings for producing electrical energy representative of the magnitude of radiant energy passing through said gratings.

For further objects and advantages of the invention reference may now be had to the following description taken in conjunction with the accompanying drawings in which.

Figure 1:
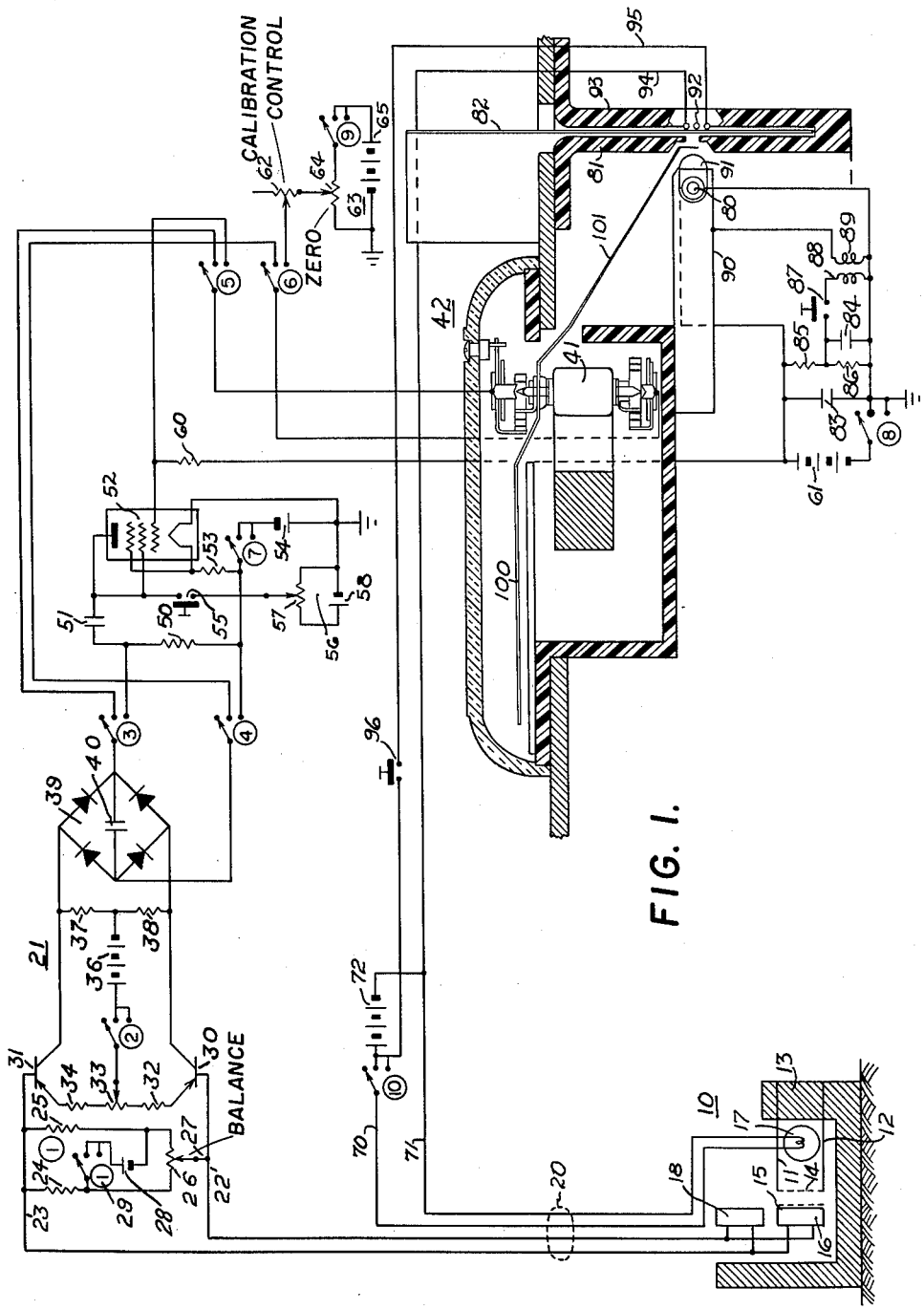
FIG. 1 is a schematic diagram partially in section showing a detecting, amplifying, and recording system.

Referring to the drawings, there is shown in FIG. 1, an acceleration responsive detector 10 which is comprised of a pair of springs 11 and 12 cantilever mounted on a base 13. Springs 11 and 12 support at the extremities thereof a grating 14 in a form of a photographic negative which will later be described in greater detail. A second grating 15 is rigidly supported on the base 13 and is of configuration complementary with that of the grating 14. A photocell 16 is positioned adjacent the grating 15 and is responsive to light which passes through both gratings 14 and 15. A light source 17 is mounted on the base 13 and is so positioned as to project light on to the gratings 14 and 15. Light from lamp 17 also impinges a second photocell 18 which is positioned adjacent photocell 16. Cells 16 and 18 are connected in parallel with opposed polarities.

A cable 20 extends from the detector 10 to a sensing system 21 having at the input thereof a balancing network connected across input conductors 22 and 23. The balancing nework includes resistors 24 and 25, each connected at the upper terminal thereof to conductor 23. The lower terminals of resistors 24 and 25 are connected to the extremities of a potentiometer 26. The variable tap 27 on potentiometer 26 is connected to conductor 22. The lower terminal of resistance 24 is connected to section one of a single circuit three pole control switch 29. The first output terminal of switch section one (as well as all other sections hereinafter identified) is an Off position; the second and third positions are connected to the positive terminal of a battery 28. The negative terminal of battery 28 is connected to the juncture between potentiometer 26 and resistance 25.

Conductors 22 and 23 are connected to the base terminal of transistor amplifier elements 30 and 31 respectively. The transistor elements 30 and 31 are connected in a circuit as to form a temperature compensated amplifying circuit for signals generated by the vibration detector 10. The emitter of transistor 30 is connected by way of a resistor 32 to the lower terminal of a potentiometer 33. The emitter of transistor 31 is connected by way of resistance 34 to the upper terminal of potentiometer 33. The variable tap on potentiometer 33 is connected to section two of the multi-terminal control switch 29. The second and third terminals of section two of the control switch 29 are connected to the positive terminal of the transistor battery 36. The negative terminal of battery 36 is connected by way of resistance 37 to the collector element of transistor 31 and by way of resistance 38 to the collector element of transistor 30.

Signal voltages are thus amplified, and applied across resistances 37 and 38 and to a full wave rectifying bridge network 39. A condenser 40 is connected across output diagonal of the bridge 39 with the diagonal also being connected to sections three and four of the control switch 29, respectively. The second terminal of section three is connected to the second terminal of section five of control switch 29. Similarly, the second terminal of section four is connected to the second terminal of section six of switch 29. The armatures of sections five and six of control switch 29 form an output circuit and are connected to the coil 41 of a microammeter 42 which provides an indication of the voltages appearing at the armatures of sections five and six.

When the control switch 29 is in position two, the meter 42 may be calibrated as hereinafter described. When the switches are in position three the full wave rectified voltage appearing across condenser 40 is applied across a resistor 50. The upper terminal of resistor 50 is connected to one terminal of a condenser 51. The second terminal of condenser 51 is connected to the anode of a metering tube 52. The lower terminal of resistance 50 is connected by way of resistor 53 to one terminal of the heater of tube 52. The second terminal of the heater of tube 52 is connected to ground.

The heater circuit for the tube 52 is completed by way of section seven of the control switch 29. The second and third terminals of the section seven are connected to the negative terminal of a heater current source, such as a battery 54. The positive terminal of battery 54 is connected to ground.

The anode of tube 52 is connected to the screen grid of tube 52 and by way of a push button switch 55 and a zero-balance circuit 56 to the ground terminal. The zero-balance circuit 56 comprises a potentiometer 57 connected across a battery 58 the negative terminal of which is connected to ground. The control grid of tube 52 is connected by way of resistance 60, battery 61, and section eight of the control switch 29 to ground. The control grid of tube 52 is also connected to the third terminal of section five of the control switch 29. The third terminal of section six of control switch 29 is connected by way of the rheostat 62 and thence by way of a zero positioning circuit 63 to ground. The zero positioning circuit 63 comprises an input potentiometer 64 having the upper terminal thereof connected to the armature of section nine of control switch 29. Terminals two and three of section nine are connected to the positive terminal of a battery 65. The negative terminal of battery 65 is connected to the lower terminal of resistance 64 and to ground.

The foregoing description has set forth the elements which comprise the signal channel and the calibration channel for the measuring instrument. The excitation circuit for the detector 10 and the system for actually recording an indication on meter 41 will now be described. With respect to excitation of detector 10 there is provided a pair of conductors 70 and 71 forming a part of cable 20. Conductor 70 leads to the armature of section ten of the control switch 29. The second and third terminals of section ten are connected to the positive terminal of a battery 72. The negative terminal of battery 72 is connected to conductor 71. When section ten is in either position two or three the light bulb 17 will be energized to illuminate the gratings 14 and 15 and thereby produce a voltage output from the photocells 16 and 18.

The means for recording the indication of meter 41 is indicated schematically in FIGURE 1, and comprises the flash tube 80 which is positioned adjacent an aperture in a baffle 81. A photo sensitive film 82 positioned in a slot behind baffle 81 is exposed when the lamp 80 is energized. Lamp 80 is energized from battery 61. Battery 61 charges a condenser 83. Condenser 83 is connected directly across lamp 80. A second condenser 84 is connected between the juncture intermediate resistances 85 and 86 and the lower terminal of condenser 83. The upper terminal of condenser 84 is connected by way of a push button switch 87 and the primary winding 88 of a triggering transformer. The secondary winding 89 of the triggering transformer is connected to a metallic holder 90 in which the lamp 80 is mounted. Application of the high-voltage to holder 90 as upon discharge of condenser 84 through primary coil 88 serves to ionize gas in lamp 80. Upon ionization of the gas in lamp 80 condenser 83 then discharges through the tube producing a flash of light which is focused by a lens 91 through the aperture in baffle 81 onto the photographic film 82. The photographic film 82 is preferably ultra-violet sensitive and of the heat-developing type. A heater 92 is provided preferably molded in the back plate 93 of the film holder. A circuit comprising conductors 94 and 95 serve as an energizing circuit for the heater 92. Conductor 94 is connected to the negative terminal of battery 72. Conductor 95 is connected to the positive terminal of battery 72 by way of push button switch 96. Meter 41 is a microammeter of well-known type as will hereinafter be identified and is provided with the usual pointer 100. To meter 41 there has been added a pointer extension 101 which extends in direction opposite pointer 100 and after clearing the meter coil and magnet structure is bent downwardly from the plane of the pointer 100 so as to extend into the path of the light beam passing through lens 91 and the slot in baffle 81. Thus, upon energization of lamp 80 light passing through baffle 81 is interrupted at the point occupied by the pointer 100.

It will now be understood that the system as above described will be employed to determine the maximum or peak acceleration which the detector has experienced within a period of from minutes to hours prior to excitation of the lamp 80. The tube 52 operating in conjunction with condenser 51 and the associated circuits comprise a peak reading volt meter having an extremely long time constant by reason of operation as an inverted pentode. Current can flow through tube 52 to charge condenser 51 but cannot flow in the opposite direction. Thus, the instrument may be placed at a given test site to sense any subsequently occurring vibrations. The peak acceleration detected by the detector 10 in the ensuing interval will cause condenser 51 to be charged to a voltage proportional thereto. The change in anode potential on the anode of tube 52 alters the grid-cathode transconductance and thus it alters the voltage from battery 61 appearing on the grid of tube 52. Condenser 51 will then retain its charge until manually discharged or until such a long period of time expires as to permit discharge by leakage. Discharge time by leakage may be of the order of many hours.

While the details of the detector 10 and the recorder will later be described the operation of the circuit in conjunction therewith will be understood as follows.

The control switch 29 having sections 1–10 will first be placed in position two which is a "balancing position." The detector 10 is placed in the position that it is to be operated. The potentiometer 27 is adjusted until the pointer 100 on meter 42 reads zero. The control switch 29 is then placed in the number three position and the instrument is ready to be calibrated. Preparatory to calibration, the instrument is zeroed by closing push button switch 55 and adjusting the zero position potentiometer 26 until meter 42 again reads zero. Switch 55 serves to discharge condenser 51. The sensitivity of the system is then adjusted to a desired level as will hereinafter be described as by adjusting the rheostat 62. Thereafter signals generated by detector 10 are amplified in elements 30 and 31 and applied to rectifier 39 and appear across resistor 50. Such signals serve to draw current through tube 52 and charge condenser 51 to a voltage equal to the peak amplitude of any voltage which appears across resistor 50. Condenser 51 will then retain the latter voltage until discharged by closure of switch 55.

It will be noted however, that the meter 42 is actuated by voltages appearing on the control grid of tube 52. The voltage on the anode of tube 52 in the interval following the appearance of a high amplitude signal will be proportional to the voltage on condenser 51. The latter voltage serves to alter the grid-cathode transconductance of tube 52 and controls the level of the voltage appearing on the control grid which forms the output circuit of the tube. Any current flowing from the heater of tube 52 to the control grid will flow through the resistance 60 and the supply source 61. The voltage drop across the grid-cathode section of tube 52 is then applied through sections five and six of the control switch 29 to the coil 41 of meter 42. The voltage applied to the meter 42 is actually the voltage appearing between ground and the control grid and will remain constant so long as the voltage on condenser 51 remains unchanged.

An operator may at any time after a given test within the period required for discharge of condenser 51 return to the instrument. The pointer 100 will be found positioned in front of the film 82 at a point representative of voltage on condenser 51. Closure of switch 87 fires the tube 80 to make the suitable photographic impression on the film 82. As indicated, film 82 is adapted to be sensitive preferably to the ultra-violet end of the light spectrum and preferably is relatively insensitive to daylight so that it may be handled with reasonable facility. Paper sold by Kalvar Corp. and identified as Kalfax paper has been found to be suitable, particularly since it may be developed by heating the coil or heater element 92.

Figure 2:
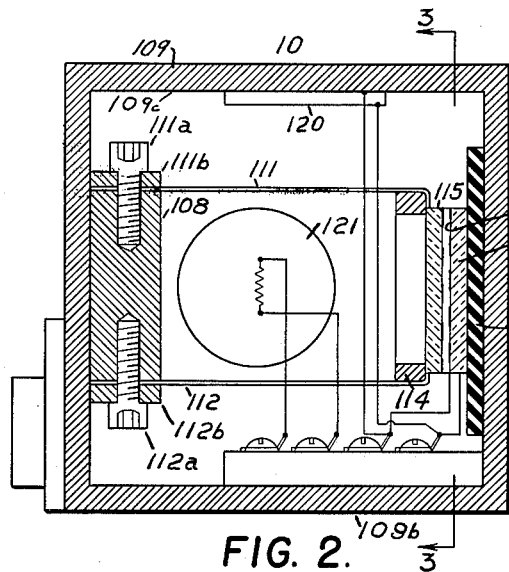
FIG. 2 is a sectional view of the detector shown schematically or diagrammatically in FIG. 1.

Referring now to FIGURE 2, there is illustrated a side view, in section, of the detector 10. Detector 10 in one embodiment was in the form of a cube approximately 1¼" in diameter. The detector 10 included a mounting block 108 supported from one side of the case 109. The springs 111 and 112 were cantilever mounted at the opposite ends thereof on the mounting block and secured by suitable lugs. More particularly, spring 111 is secured under a mounting block 111b as by screw 111a. Spring 112 is secured under mounting block 112b by screw 112a.

Figure 3:
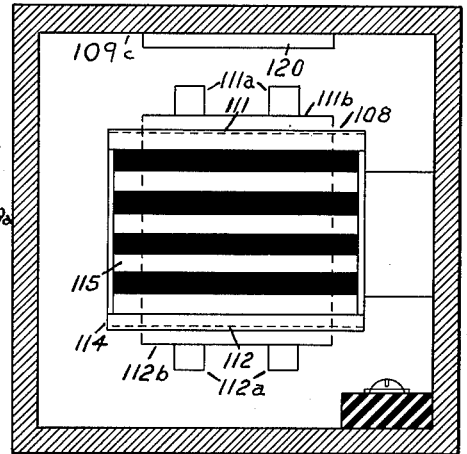
FIG. 3 is a sectional view of the detector of FIG. 2 taken along the lines of 3—3 of FIG. 2.

The free ends of the springs 111 and 112 are secured to a brass frame 114. The brass frame 114 is rectangular in shape as seen in FIGURE 3 and supports on the outer face thereof a photographic glass plate 115. The photographic plate or negative 115 comprising horizontal spaced stripes, alternately black and white, is mounted on the outer face of the brass frame 114. A similar plate is mounted as to face the plate 115. More particularly, the plate 116 having a grating on the face adjacent plate 115 is mounted on the surface of a photoelectric cell 117. Photoelectric cell 117 is mounted on a panel 118 of insulating material.

As best seen in FIGURE 2 the gratings on the glass plates 115 and 116 are preferably offset with respect to each other a distance equal to about ⅓ the width of the lines thereof when the detector 10 is lying on the bottom or base portion 109b. By this means, an optimum sensitivity will be obtained for all positions of operation of the detector 10. When the detector 10 is resting on the face 109b the overlap as between the darkened portions of the grating sections will be equal to the normal displacement plus the static displacement of the spring supported plate 115 and its brass frame 114. A second photoelectric cell 120 is mounted on the inside of the upper wall 109c of the detector 10. A lamp 121 is suitably supported from the wall of the detector viewed in plan in FIGURE 2. Light from lamp 121 impinges both cells 116 and 120. The sensitive surface of photoelectric cell 120 is then initially masked or painted to lower its sensitivity so that the output therefrom when light 121 is energized will be approximately the average of the output from the cell 116 when the cell is placed in two positions, the first on the face 109a and the second on face 109b. Suitable circuits extending through cable 20 connect the elements to the sensing system in the manner in FIGURE 1.

Figure 4:
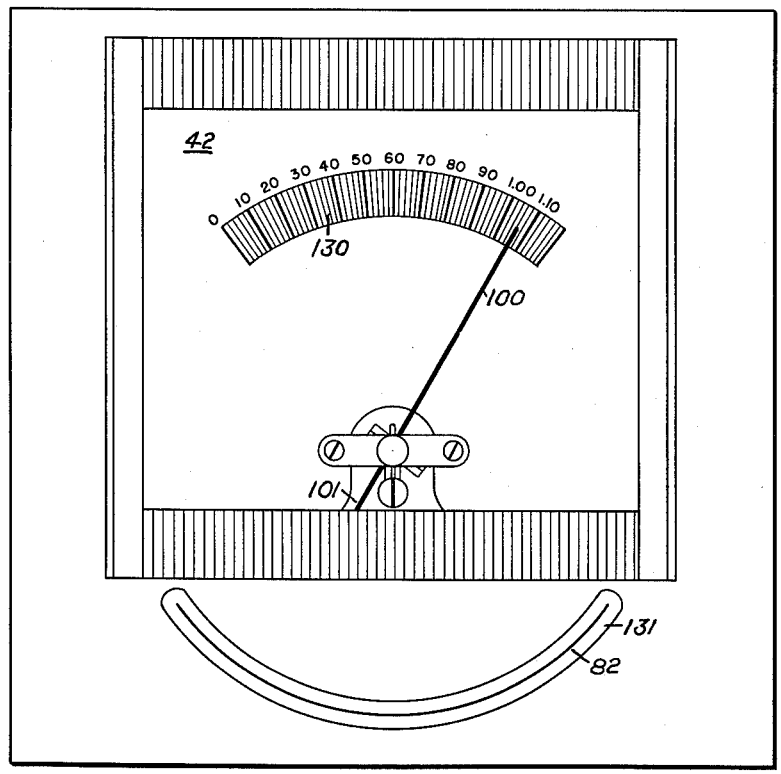
FIG. 4 is a view of the face of the meter and recording unit shown in FIG. 1.

Referring now to FIGURE 4 there is illustrated the top view of the meter recorder system shown in FIGURE 1. While the instrument itself will include the switches and potentiometer controls shown in the circuit of FIGURE 1, only the meter face and the card holder have been shown in detail in FIGURE 4. The meter having a scale and a pointer are illustrated. Pointer 100 is caused to be deflected over scale 130 to indicate, upon suitable calibration, the magnitude of the voltage on condenser 51 in FIGURE 1. A portion of the second pointer, a recording pointer 101, is illustrated as it extends from the pivot point of the coil 41 in direction opposite to pointer 100. The card upon which the record of the voltage on condenser 51 is to be made, the card 82, is inserted into an elongated slot which extends vertically downward into the inside of the meter housing. Over the portion of the slot corresponding to the limits of deflection of the meter 42 the slot 131 is cylindrical in form and serves to accommodate the chart 82 in the proper position for a recording operation produced upon discharge of the lamp 80 of FIGURE 1. Preferably the axis of the cylindrical portion of the slot 131 corresponds with the axis of rotation of the coil 41 of meter 42.

Operation of the system thus far described will produce a voltage on condenser 51 and a corresponding or representative deflection on the arm 101 representative of the maximum amplitude of the acceleration component of vibration detected by the detector 10. When it is desired to record the latter voltage the switch 87 is closed manually to discharge condenser 84 through the discharge tube 80.

Thereafter the switch 96 is closed for a period of about 15 seconds, for time sufficient to heat the coil or winding 92 to develop the film or light-sensitive material on card 82. Thereafter preparatory to a new measurement the switch 55 is closed to return the meter deflection to zero.

It will now be appreciated that the system will be employed in a preferred mode by placing it in a zone or area where the vibration is to be monitored. At any time thereafter the deflection of the meter will indicate the maximum acceleration experienced at such location. This system may be readily operated during daylight, the light sensitive material on card 82 being sensitive to the ultra-violet light and relatively insensitive to daylight and may thus be handled for the short periods necessary in daylight without rendering it ineffective to receive the recordings herein described.

In one embodiment of the invention a system was employed having the following elements:

| | |
|---|---|
| Cells 16 and 18 | International Rectifier #B2. |
| Resistors 24, 25 | 33,000 ohms. |
| Battery 28, 54, 58 | 1½ volts. |
| Potentiometer 26 | 50,000 ohms. |
| Transistors 30, 31 | GE 265. |
| Resistors 32, 34 | 27 ohms. |
| Potentiometer 33 | 50 ohms. |
| Battery 36 | 45 volts. |
| Resistors 37, 38 | 100,000 ohms. |
| Rectifiers 39 | RCA 1N54. |
| Capacitor 40 | .01 mfd. |
| Capacitor 51 | .00025 mfd. |
| Tube 52 | 1R5. |
| Resistor 53 | 2 ohms. |
| Rheostat 62 | 50,000 ohms. |
| Resistor 60 | 0.5 meg. ohms. |
| Potentiometer 64 | 200 ohms. |

| Battery 65 | 9 volt. |
| --- | --- |
| Battery 61 | 510 volts. |
| Capacitor 83 | 300 mfd. |
| Resistor 85 | 6.0 meg. ohms. |
| Resistor 86 | 3.0 meg. ohms. |
| Capacitor 84 | .25 mfd. |
| Trigger transformer 88, 89 | Stancor #P-6426. |
| Recorder pointer 101 | .032 inch diam. alum. tubing. |
| Meter 42 | Simpson 3389 (100 microampere). |
| Flash tube 80 | Heiland Proxolite. |
| Lamp 17 | GE #44. |

Having described the invention and the preferred embodiment thereof it will now be understood that the vibration detector 10 shown schematically in FIG. 1 and shown in detailed sectional views of FIG. 2 and FIG. 3 may be modified while retaining all the desirable features thereof. For example, the detector elements 16 and 18 may be included in a bridge network together with additional elements of like nature to provide an output voltage more sensitive than that provided by the relatively simple structure as shown in FIGS. 1, 2, and 3. Furthermore, photocells are available with the grating such as grating 15 forming a basic part of the photocell structure and may thus be readily employed in applicant's detecting system.

It will be recognized that the detecting system comprises a mass which is supported by a resilient cantilever structure which has a compliance in a selected direction with a source of radiant energy positioned with the mass in the path of the energy leaving from the source. Means such as the grating is provided which is carried with the mass for varying the transmission of the radiant energy along the said path in dependence upon vibration, preferably the acceleration component of vibration, of said mass. The detectors 16 and 18 are then provided as to be responsive first to the energy transmitted through the variable transmission path and energy which is not transmitted along the said path respectively. As illustrated in FIG. 1 the detectors 16 and 18 are connected so that the voltages generated therein are opposed and normally cancel each other completely so that any voltage appearing in the output circuit comprising conductors 22 and 23 will be substantially entirely due to the vibrational components controlled by grating 14.

The system provided herein responsive to the output of the detector 10 may be characterized by the production and maintenance of an electrical condition such as the charge on condenser 51 which is proportional to the peak acceleration experienced by detector 10. The recording system is responsive to such electrical condition and more particularly the rotation of the meter coil or movement positions vane 101 to a point proportional to the magnitude of the condition on condenser 51. It wil be recognized that such condition may comprise the movement of the meter itself as for example by causing deflection of the meter in response to the acceleration dependent signals from the source, and providing a ratchet mechanism which will permit deflection of the meter vane 101 in one sense or direction, it will restrict the vane from returning in the other direction to a quiescent point following cessation of signals from the source 10. With the meter vane thus locked, light may be produced as by energizing lamp 80 to record on the card 82 an indication representative of the magnitude of the acceleration.

While the invention has been described in connection with specific embodiments such as would enable one skilled in the art to make and use the same it will be recognized that further modifications may appear to those skilled in the art and it is intended to cover such modifications as fall within the scope of the appendant claims.

What is claimed is:

1. The combination which comprises a source of radiant energy, vibration responsive means for controlling transmission of energy from said source along a selected path in dependence upon the acceleration of said source, detector means in said path responsive to transmitted radiant energy for generating an electrical effect representative of said acceleration, means responsive to said electrical effect for generating an electrical condition representative of a maximum amplitude of said acceleration and for holding said condition, a rotating element including a coil mounted in a magnetic field and responsive to said condition for positioning said coil in dependence upon said condition, a vane extending from and rotating with said coil, a light source adjacent to one side of said vane adapted to be momentarily energized, means for positioning a light sensitive film on the other side of said vane in an arc symmetrical with respect to the center of rotation of said coil, a baffle intermediate said vane and said film having a slot located along the traverse of said vane as it rotates with said coil, and means mounted in the positioning means for said film for applying heat to said film to develop or fix any impression produced upon said film upon energization of said light source.

2. A system for measuring the maximum acceleration of a vibrating body which comprises an accelerometer for generating signals representative of acceleration of said body, electrical means for amplifying said signals, a peak voltage meter circuit connected to receive the amplified signals and including a holding condenser for receiving and holding a charge representative of the peak amplitude of said signals, a meter connected in said meter circuit and adapted to be deflected in proportion to the voltage on said holding condenser, holder means adapted to receive a light sensitive sheet adjacent to the indicator on said meter, a light source positioned adjacent the indicator on said meter on the side thereof opposite said holder means, and means for momentarily energizing said light source for impressing an indication on said light sensitive sheet in said holder means of the deflection of said indicator.

3. In a system for measuring the maximum acceleration of a vibrating body which comprises an accelerometer for generating signals representative of acceleration of said body, electrical means for amplifying said signals, a peak voltage meter circuit connected to receive the amplified signals and including a holding condenser on which there is established a voltage proportional to the maximum amplitude of said amplified signals, a meter connected in said meter circuit having an arm extending from and rotating with the armature of said meter, a holder having a circular slot-like receptacle adapted to receive a light sensitive card, said receptacle having curvature symmetrical relative to the center of rotation of said armature and extending in direction substantially the same as the axis of said armature, an extension of said arm positioned adjacent said holder and extending in the direction of the axis of said armature, a light source positioned adjacent said extension and on the side thereof opposite said holder, and means for momentarily energizing said light source to impresss an indication on a light sensitive card in said holder of the magnitude of the voltage on said condenser.

4. In a system for measuring maximum acceleration of a vibrating body the combination which comprises a mass adapted to be supported by said body for vibration, a source of radiant energy positioned to direct radiant energy in a path including said mass, means carried by said mass for varying the transmission of radiant energy along said path in dependence upon vibration of said mass, detector means responsive to transmitted energy for generating a voltage representative of said vibration, circuit means including an indicating element connected to said detector and responsive to said voltage for moving said indicating element to a position representative of the maximum amplitude of said vibration, a record receiving element of the light sensitive type positioned adjacent to said indicating element, a light source adjacent said indicating element on the side thereof opposite said record receiving element, and means for momentarily energizing said light source for exposing said record receiving element in dependence upon the positional relation thereto of said indicating element for impressing on said record receiving element an indication of the magnitude of said voltage.

References Cited in the file of this patent

UNITED STATES PATENTS

| | | |
|---|---|---|
| 1,054,598 | Mullner | Feb. 25, 1913 |
| 2,301,396 | Graf | Nov. 10, 1942 |
| 2,343,063 | Kent | Feb. 29, 1944 |
| 2,359,245 | Ritzmann | Sept. 26, 1944 |
| 2,491,240 | Zmuda et al. | Dec. 13, 1949 |
| 2,614,228 | Volk | Oct. 14, 1952 |
| 2,665,185 | Paine | Jan. 5, 1954 |
| 2,709,637 | Mayer | May 31, 1955 |
| 2,750,575 | Doty et al. | June 12, 1956 |